July 24, 1956  T. J. LEVELL ET AL  2,755,891
POWER BRAKE WITH VARIABLE RATIO LEVER
Filed July 23, 1953

T. J. LEVELL
J. H. DOUMA
INVENTORS
E. C. McRae
BY J. R. Faulkner
J. H. Oster
ATTORNEYS

United States Patent Office 2,755,891
Patented July 24, 1956

2,755,891

POWER BRAKE WITH VARIABLE RATIO LEVER

Thomas J. Levell, Detroit, and John H. Douma, Dearborn, Mich., assignors to Ford Motor Company, Dearborn, Mich., a corporation of Delaware Application July 23, 1953, Serial No. 369,905

5 Claims. (Cl. 188—152)

This invention relates generally to power brakes for motor vehicles, and has particular reference to a power brake booster unit of the vacuum type.

Power brake booster units of the vacuum type for motor vehicles conventionally use a construction in which the manual effort applied through the brake pedal is augmented by a booster unit utilizing the differential pressure between the atmosphere and the vacuum supplied by the vehicle engine manifold. In the event of failure of the vacuum supply, the brakes can still be applied by direct manual effort. A low pedal ratio, however, is usually used with power brake installations to provide a low pedal position and to minimize the pedal travel, and while the booster unit permits the use of a low pedal ratio with an acceptable pedal pressure, the arrangement greatly increases the pedal pressure required to actuate the brakes and stop the vehicle in the event of failure of the vacuum supply. It is therefore an object of the present invention to provide a power brake construction in which a low pedal ratio is utilized during normal operation of the power brake mechanism but in which the pedal ratio is automatically increased in the event the booster unit becomes inoperative due to failure of the vacuum supply. Thus, should it become necessary to apply the brakes without power assistance the pedal ratio is immediately increased and the pedal pressure necessary to apply the brakes correspondingly decreased to facilitate the manual application of the brakes. Furthermore, the arrangement is such that upon reinstatement of the vacuum supply to again render the booster unit operative the original low pedal ratio is automatically reinstated. An additional feature of the invention resides in the fact that conventional power brake installations can be readily changed to incorporate the present invention without materially altering the original construction and with a minimum of additional cost.

Other object and advantages of this invention will be made more apparent as this description proceeds, particularly when considered in connection with the accompanying drawings, wherein.

Figure 1:
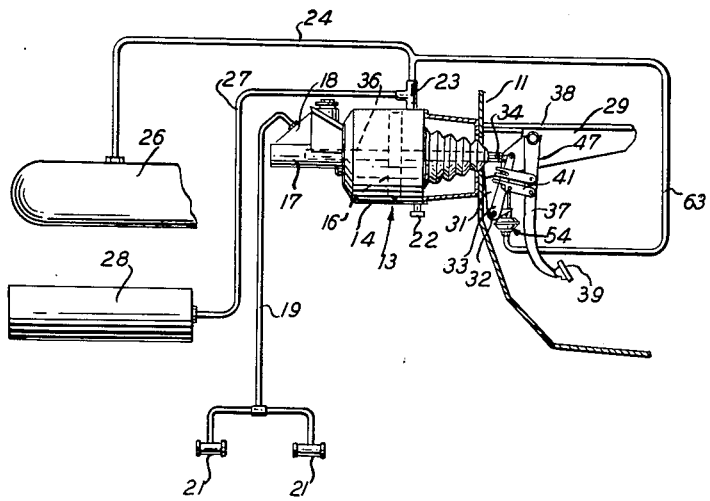
Figure 1 is a semidiagrammatic side elevational view of a power brake mechanism incorporating the present invention.

Referring now to the drawings, and particularly to Figure 1, the reference character 11 indicates the dash panel of a motor vehicle. Secured to the dash panel 11 on the engine compartment side thereof is a power brake booster unit 13 of conventional construction. The unit 13 comprises a booster cylinder 14, a piston 16 reciprocable therein, and a hydraulic master cylinder 17 provided with an integral reservoir 18. The master cylinder is connected by means of a conduit 19 to wheel brake cylinders 21.

The booster cylinder 14 is provided with an air inlet 22 and with a vacuum inlet 23, the latter being connected by means of a conduit 24 to the intake manifold 26 of the vehicle engine (not shown). The inlet 23 is also connected by means of a conduit 27 to a vacuum reservoir tank 28.

Extending rearwardly from the dash panel 11 of the vehicle is a structural member 29 having a downwardly projecting extension 31 forming a support for the pivotal mounting 32 of a brake applying lever 33. The upper end of the lever 33 is connected by means of a connecting rod 34 to the piston 16 in the booster cylinder 14.

Movable with the connecting rod 34 and the piston 16 is a piston rod 36. The piston rod 36 extends into the master cylinder 17 and upon forward movement thereof displaces hydraulic fluid from the master cylinder into the conduit 19 leading to the wheel cylinder 21 to apply the wheel brakes (not shown).

Counterclockwise swinging movement of the brake applying lever 33, as seen in Figure 1, actuates conventional valving to expose the rearward face of the piston 16 to atmospheric pressure and the forward face of the piston to the vacuum of the intake manifold 26 to move the piston 16 and piston rod 36 to the left under power actuation, and to thus apply the brakes. Inasmuch as there is a direct mechanical connection between the connecting rod 34 and the piston rod 36, it will be seen that it is possible to move the piston rod 36 into the master cylinder 17 to displace fluid therefrom and to apply the brakes manually in the event of the failure of the vacuum supply from the intake manifold 26.

Figure 2:
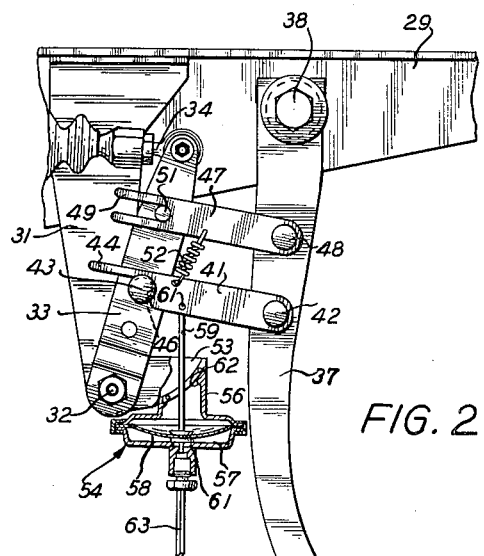
Figure 2 is an enlarged cross sectional view, partly in section, of a portion of the construction shown in Figure 1.

Referring now to Figure 2, the reference character 37 indicates a brake pedal arm pivotally connected to the structural member 29 by means of a pivotal connection 38 and carrying at its lower extremity a brake pedal 39 for operation by the driver. A link 41 is pivotally connected to the brake pedal arm 37 by means of a pivot pin 42 and at its opposite end engages a pin 43 carried by the brake applying lever 33. The rearward end of the link 41 is cut away to form a narrow terminal flange 44 and a shoulder 46. The shoulder 46 is curved to conform to the shape of the pivot pin 43.

Spaced above the link 41 is a second link 47 pivotally connected at its forward end to the brake pedal arm 37 by means of a pivot pin 48. The rearward end of the link 47 is formed with a longitudinally extending slot 49 receiving a pin 51 secured to the brake applying lever 33. A coil spring 52 extends between the links 41 and 47.

The lower end of the bracket 31 carried by the structural member 29 of the vehicle body is formed with a rearwardly extending flange 53 supporting a diaphragm housing 54. The housing 54 comprises upper and lower sections 56 and 57 respectively having their marginal edges clamped together and clamping therebetween the marginal edges of a flexible diaphragm 58. The diaphragm 58 is connected to the lower link 41 by means of a connecting rod 59, the upper end of the rod 59 having a bent end 61 extending through a hole in the link 41, and the lower end of the rod 59 being connected to the center portion of the diaphragm by means of a pair of washers 61 on opposite sides thereof.

The upper section 56 of the diaphragm housing 54 is provided with an opening 62 through which the connecting rod 59 extends, also serving to expose the upper surface of the diaphragm 58 to atmospheric pressure. The lower section 57 of the housing 54 forms, with the diaphragm 58, a closed chamber connected to the vacuum fitting 23 of the booster unit 13 by means of a conduit 63. The vacuum of the intake manifold 26 is thus supplied to the lower section 57 of the diaphragm housing 54 beneath the diaphragm 58 whenever the vehicle engine is running.

It will be apparent from the foregoing description that whenever the vehicle engine is running or when vacuum is supplied to the intake fitting 23 of the booster cylinder from the vacuum reservoir 28 so as to supply sufficient vacuum to actuate the booster unit, vacuum will also be supplied to the diaphragm chamber 54 beneath the diaphragm 58. Since the opposite side of the diaphragm 58 is exposed to atmospheric pressure, the diaphragm and the connecting rod 59 connected thereto will be pulled downwardly to swing the lower link 4 downwardly against the action of coil spring 52 to the position shown in Figure 2. Under these conditions, actuation of the foot pedal 39 by the vehicle driver transmits force from the brake pedal arm 37 through the link 41 to the brake applying level 33 and thence through the connecting rod 34 to the booster unit to apply the brakes with power assistance in the conventional manner. During the transfer of thrust from the brake pedal arm 37 to the brake applying lever 33 through the lower link 41, the upper link 47 is inoperative since the pin 51 on the brake applying lever moves within the slot 49 in the link.

The link 41 and the brake applying lever 33 and brake pedal arm 37 are so arranged that a relatively low pedal ratio is obtained. The arrangement shown is in the ratio of approximately 1 to 1 so that a movement of the brake pedal 39 results in a corresponding movement of the connecting rod 34. This low pedal ratio enables a low pedal position to be utilized to facilitate the transfer of the driver's foot from the accelerator pedal to the brake pedal, and in addition provides for brake application with a relatively small pedal travel.

The vacuum reservoir 28 provides sufficient vacuum capacity for one or two brake applications in the event of failure or stalling of the engine so as to temporarily remove the source of vacuum normally supplied by the intake manifold 26. When the vacuum supply of the reservoir 28 is depleted, the brakes can only be applied by direct manual effort, and with the conventional arrangement the pedal pressure required to apply the brakes and stop the vehicle is large due to the low pedal ratio. With this construction, however, the failure of the vacuum supply from the intake manifold 26 and the depletion of the supply from the reservoir 28 is accompanied by the loss of vacuum beneath the diaphragm 58 in the diaphragm housing 54. Under these circumstances, the link 41 is no longer held down into engagement with the pin 43 carried by the brake applying lever 33, and consequently the link 41 is moved upwardly to the position shown in Figure 3 under the action of the coil spring 52 until the shoulder 46 of the link is out of engagement with the pin 43.

With the link 41 thus no longer forming a connection between the brake pedal arm 37 and the brake applying lever 33, application of the foot pedal 39 causes force to be transferred from the brake pedal arm 37 to the brake applying arm 33 through the upper link 47. The pivot 48 connecting the upper link 47 to the brake pedal arm 37 is substantially closer to the pivotal mounting 38 of the arm than is the pivotal connection 42 between the lower link and the arm, and the pin 51 forming the connection between the upper link 47 and the brake applying lever 33 is considerably nearer to the pivotal connection between the lever and the connecting rod 34 than is the connection 43 between the lower link 41 and the brake applying lever 33. Consequently the pedal ratio is substantially increased, and as shown in the drawing is approximately 3 to 1. This increased pedal ratio enables the brakes to be applied manually in the event of power failure with a much lower pedal pressure than otherwise required.

Upon reinstatement of the vacuum supply, the diaphragm 58 is moved downwardly and through its connection to the lower link 41 by means of the rod 59 returns the link 41 to the position shown in Figure 2 in which the shoulder 46 is in engagement with the pin 43 of the brake applying lever so as to revert to the low pedal ratio desirable during power brake application.

From the foregoing it will be seen that the transfer from low to high pedal ratio and vice versa is automatically accomplished without attention by the driver, the shift being made automatically and immediately upon loss or reinstatement respectively of the vacuum supply.

Figure 3:
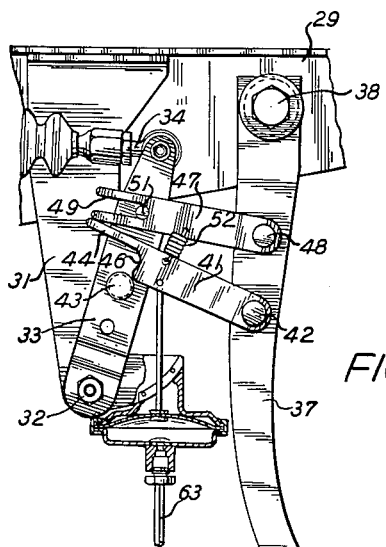
Figure 3 is a view similar to Figure 2 but illustrating the position of the parts with a power failure.
Figure 4:
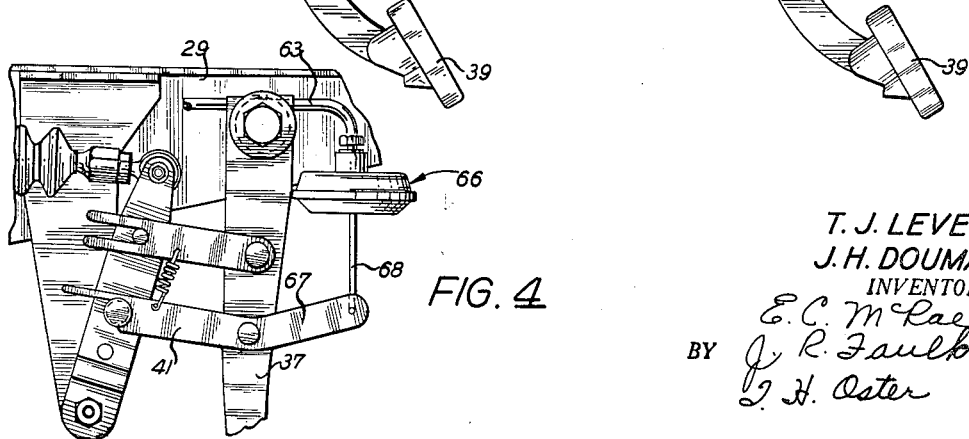
Figure 4 is an elevational view of a modification.

Referring now to Figure 4, it will be seen that this construction differs from that shown in Figures 2 and 3 principally in the location of the diaphragm housing 66. In this arrangement the housing 66 is inverted and is mounted upon the structural member 29 adjacent the pivotal mounting of the brake pedal arm 37 and is connected to an extension 67 of the lower link 41 by means of a connecting rod 68. The operation is similar to that previously described.

It will be understood that the invention is not to be limited to the exact construction shown and described, but that various changes and modifications may be made without departing from the spirit and scope of the invention, as defined in the appended claims.

What is claimed is:

1. In a motor vehicle having a hydraulic brake system, a source of vacuum and a support, a vacuum operated power brake device mounted upon said support for normally actuating said hydraulic brake system, a brake applying lever pivotally mounted upon said support, means connecting said brake applying lever to said power brake device, a foot pedal pivotally mounted upon said support adjacent said brake applying lever, a link interconnecting said brake pedal lever and said brake applying lever to transmit force from said pedal to said lever, a servo unit mounted upon said support and connected to said link, means connecting said servo unit to said source of vacuum to hold said link in operative position relative to said foot pedal and said brake applying lever, spring means acting upon said link to move said link to an inoperative position in the event of failure of said source of vacuum, and a second link interconnecting said brake pedal and said brake applying lever and operative to transmit force from said pedal to said lever at a different ratio when said first mentioned link is rendered inoperative.

2. The structure defined by claim 1 which is further characterized in that said first mentioned link is pivotally connected to one of said levers and has a detachable thrust connection with the other of said levers, said servo unit when supplied by vacuum from said source of vacuum swinging said link about its pivotal connection to said one lever into engagement with the thrust connection with said other lever, and said first mentioned link being swingable in the opposite direction under the actuation of said spring to move said link out of engagement with said thrust connection whenever said servo unit is not supplied with vacuum from said source of vacuum.

3. The structure defined by claim 2 which is further characterized in that said second mentioned link has a pivotal connection with one of said levers and a lost motion connection with the other of said levers to permit relative movement between said second mentioned link and said last mentioned lever and when said first mentioned link is engaged with said thrust connection but forms a force transmitting connection between said levers when said first mentioned link is disengaged from said thrust connection.

4. In a motor vehicle having a source of vacuum power and a support, a vacuum operated power brake device mounted upon said support, a manually operable lever pivotally mounted upon said support, a pair of spaced links between said lever and said power brake device for transmitting force from said lever to said device in two different ratios, a servo unit mounted upon said support, means connecting said servo unit to said source of vacuum power, said servo unit being connected to one of said links to render said one link operative to transmit force from the lever to the device when said servo unit is supplied with vacuum from said source and to render said other link operative to transmit force from said lever to said device at a different ratio when said servo unit is not supplied with vacuum from said source.

5. In a motor vehicle having a source of vacuum power and a support, a vacuum operated power brake device mounted upon said support, a manually operable lever pivotally mounted upon said support, a pair of links between said lever and said power brake device for transmitting force from said lever to said device in two different ratios, said links being connected to said manually operable lever at points spaced different distances from the pivotal connection of said lever to said support, one of said links also having a lost motion connection with said device and the other of said links having a detachable connection with said device, a servo unit mounted upon said support, means connecting said servo unit to said source of vacuum power, said servo unit being connected to said other link to attach said other link to said device when said servo unit is supplied with vacuum from said source and permitting detachment of said other link from said device when said servo unit is not supplied with vacuum from said source to transmit force from said lever to said device at a different ratio.

References Cited in the file of this patent

UNITED STATES PATENTS

| | | |
|---|---|---|
| 1,755,989 | Hallett | Apr. 22, 1930 |
| 2,037,869 | Wall | Apr. 21, 1936 |
| 2,341,502 | Ingres | Feb. 8, 1944 |
| 2,437,536 | Johnson et al. | Mar. 9, 1948 |